3,036,614
CUTTING AND MIXING BLADES
FOR LIQUEFIERS
Andrew S. Knapp, St. Louis, Mo., assignor to Knapp Monarch Company, St. Louis, Mo., a corporation of Delaware
Filed Apr. 13, 1959, Ser. No. 805,766
2 Claims. (Cl. 146—68)

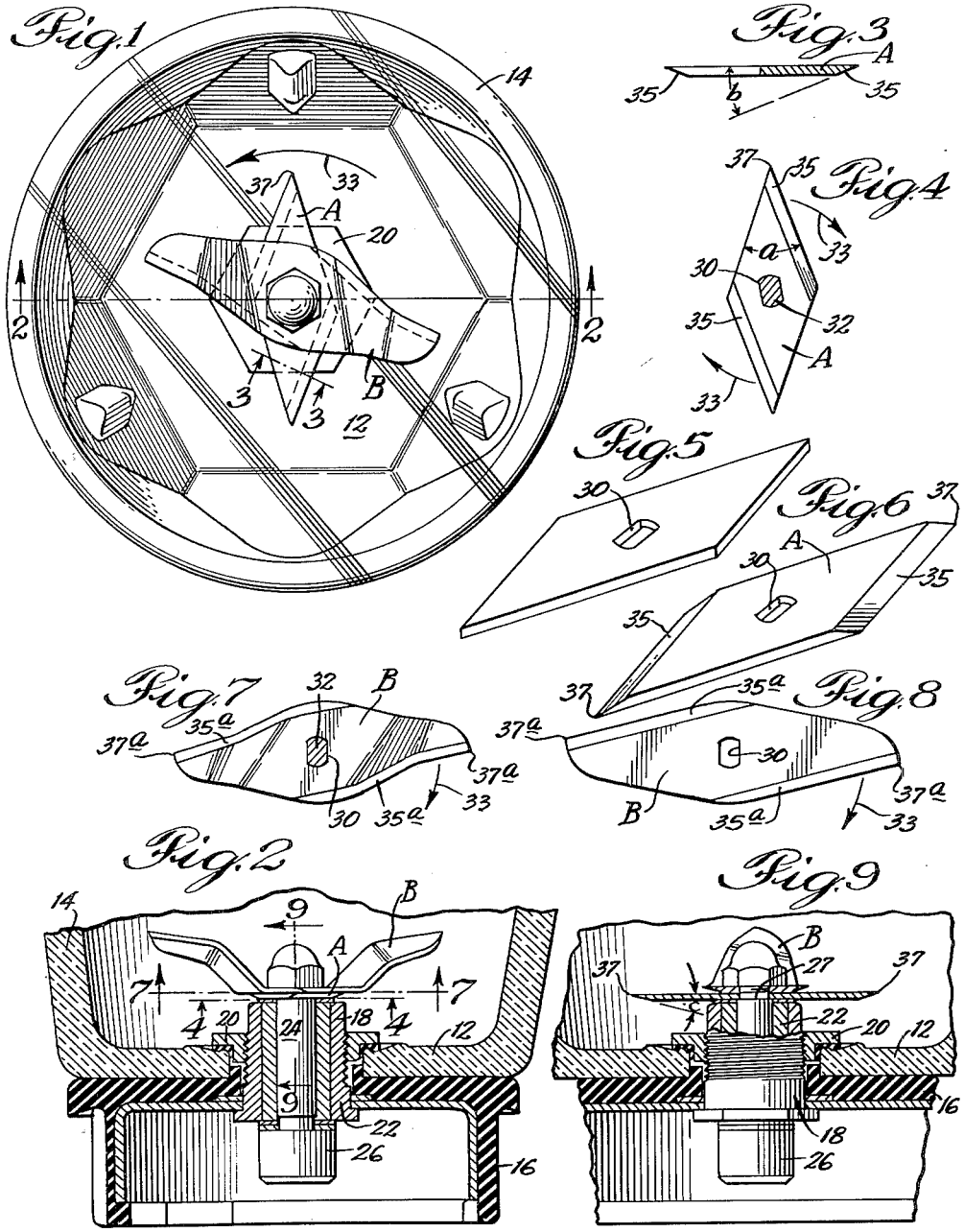

This invention relates to a liquefier for liquids and semi-solids such as the type known as a "Liquidizer" and shown in the Kochner et al. Patent No. 2,585,255 of February 12, 1952, and has particular reference to an improvement in the cutting and mixing blades thereof.

One object of the invention is to provide cutting and mixing blades which are considerably less expensive to produce than comparable blades shown in the Kochner patent, have a better cutting action on the materials fed into the liquefier, a better blending action for blending liquids therein quickly, a very effective vortex action, and for the same load reduce the temperature of the motor operating the blades.

Another object is to provide cutter blades that eliminate the necessity of grinding cutting edges along curved lines as in the Kochner patent, and eliminates the necessity of grinding the ends of the blade, the present invention being substantially diamond-shaped blades, each with only two straight edges ground to produce opposite cutting edges on each blade and sharply pointed ends on the blades which will stand up under impact as with cubes of ice dropped into the liquefier and "shaved" by the liquefier blades.

A further object is to provide an inexpensively produced set of blades which have pointed ends that dig into ice cubes or semi-solids, such as carrots and the like, to efficiently comminute the materials introduced into the bowl of the liquefier.

With these and other objects in view, my invention consists in the construction, arrangement and combination of the various parts of my cutting and mixing blades, whereby the objects above contemplated are attained, as hereinafter more fully set forth, pointed out in my claims and illustrated in detail on the accompanying drawings, wherein:

FIG. 1 is a plan view of a liquefier bowl with my improved cutting and mixing blades mounted therein;

FIG. 2 is a vertical sectional view on the line 2—2 of FIG. 1 showing the bearing and shaft for driving the liquefier blades;

FIG. 3 is an enlarged sectional view of one of my improved cutting and mixing blades per se;

FIG. 4 is a bottom plan view thereof as taken on the line 4—4 of FIG. 2;

FIG. 5 is an enlarged perspective view thereof before the blade is sharpened;

FIG. 6 is an enlarged bottom perspective view of the same blade after it is sharpened and thereupon ready for mounting in the liquefier;

FIG. 7 is a bottom plan view of the other of my improved cutting and mixing blades as taken on the line 7—7 of FIG. 2;

FIG. 8 is a bottom plan view of said other blade before it is bent to the final shape shown in FIGS. 1, 2, 7 and 9; and FIG. 9 is a vertical sectional view on the line 9—9 of FIG. 2.

On the accompanying drawing I have used the reference numeral 14 to indicate a liquefier bowl, the bottom thereof shown at 12 being secured to a resilient mounting hub 16 to fit into a suitable socket in the upper end of a motor housing such as shown in the above-noted Kochner patent.

A sleeve 18 is mounted through the hub 16 and the bottom 12 of the bowl 14 is secured in position on the hub by a flanged nut 20. A bushing 22 in the sleeve 18 serves as a bearing for a stub shaft 24 having a socketed head 26 on its lower end to connect with a suitable coupling member on the upper end of a motor shaft in the manner shown in the above-noted Kochner patent. Since the motor and housing form no part of the present invention, they have not been shown on the drawing.

The upper end of the shaft 24 is shouldered at 27 and against the shoulder are cutting and mixing blades A and B constituting my present invention. Above the shoulder 27, the shaft 24 is threaded and the blades A and B are secured in position thereon by a cap nut 28. Each blade is provided with a suitable out-of-round opening 30 to coact with a similar shape 32 of the shaft 24, as shown in FIGS. 4 and 7, to insure rotation of the blades with the shaft.

The bowl 14, it will be noted, is substantially hexagon shape inside to cooperate with the blades A and B in securing a desired coaction of the blades with liquids and semi-solids introduced into the liquefier bowl to be acted on by the blades.

The blade A is substantially diamond-shaped as shown in FIG. 4 with the angle $a$ approximately 40°. The blade is stamped out from suitable sheet steel to the shape shown in FIG. 5, and thereafter two opposite edges 35 thereof are sharpened by grinding to result in the shape shown in FIG. 6, the sharpened edges being forward with respect to the direction of rotation indicated by the arrows 33 in FIGS. 1 and 4. FIG. 3 shows the sharpening to be at an angle $b$ which is approximately 20°. The resultant of the angles $a$ and $b$ produces an even sharper angle $c$ as shown in FIG. 9 radially of the outer point of the blade A such as the angle $c$ approximately 15°. The sharpened edges 35 in FIG. 3 and the resultant acute points 37 in FIG. 7 resulting from the grinding operation, I have found to produce a very efficient cutting and mixing blade in a liquefier of the character disclosed.

The blade B is similarly sharpened at 35a and pointed at 37a while in the flat as shown in FIG. 8, and is then bent to the approximate shape shown in the Kochner patent as shown in FIGS. 1, 2, 7 and 9 of my patent drawing.

The blades A and B are very inexpensive to produce as they involve merely a punching operation and a grinding operation (plus a bending operation for the blade B), and the grinding operation is simple in that it is a single pass in a straight line for each of the edges 34 and 34a. Compared to this, the blades of the Kochner patent required curved passes along their forward edges and then additional passes across the ends which made a set of blades cost in the neighborhood of 3¢ compared to 8¢ for the present blades, a price differential of almost 3 to 1. At the same time the blades A and B give a greatly improved result when used in a liquefier.

For proper performance of a liquefier, it must first blend liquids with a good turbulent pattern in the water so that it does not take long for a blending operation, and so that the liquid is thoroughly mixed without any dead or unmixed areas remaining in the upper and lower corners. The blades A and B secure an improved blending action which blends the liquid quickly, produce a good vortex action in the center of the liquid and do not leave any dead or unmixed areas.

Secondly, a liquefier actually liquefies semi-solids (a good example is the cutting up of carrots in very fine particles and blending them with a small amount of water put into the liquefier bowl), and I find the blades A and B cut carrots into very fine particles such as necessary to produce a good-tasting carrot juice drink. They also handle a reasonable sized load of carrots and do not stall the motor driving the blades when the switch is first turned on with this kind of a load in the bowl. The blades A and B make it possible to handle this type of load from a standing start and cut the carrots quickly and into very fine particles. Actually, only about ten seconds is necessary to liquefy one full pound of diced carrots in two cups of water. At the same time a very effective vortex action is had even with the semi-solids, such as the carrot load, to prevent dead areas and provide continual movement of the mixed food for thorough mixing.

The same efficient mixing operation results when heavy batter ingredients are put into the bowl and mixed.

Thirdly, a liquefier is suitable for cutting solids and in this category the shaving of ice cubes is typical. The blades A and B effectively shave the ice instead of merely letting the ice cubes spin while the cutter blades rotate below the cubes without shaving them. The pointed ends 37 dig into the ice cubes and shave them quickly and effectively. A liquefier with my blades A and B will shave five large ice cubes in a single operation without emptying the bowl. The blades not only shave the ice quickly, but, in combination with the hexagon contour near the bottom of the bowl, they throw the shaved ice away from the blades so that it is held against the sides of the bowl, thus permitting the introduction of one ice cube after another without having the fresh cube rest on the shaved ice. The fresh ice cube drops down into the blades where it is promptly cut up.

There is also the problem of motor temperature tests. The new blades A and B permit a motor temperature reduction of 19° F. when compared with other blades such as shown in the Kochner patent. This is due in part to the more effective cutting action secured by the blades A and B and also in part to the fact that with the pointed ends 37 there is less area at the end of the blade to bind in a particle of food when the liquidizer is first started (assuming that the food is placed in the bowl before the switch is turned on). When the blades bind in a particle of food and the motor current is turned fully on, the motor windings overheat in about 15 seconds to the point where the odor from the motor insulation, varnish, etc. can be detected by the user about 30 seconds after the 15 seconds of binding. Underwriters' requirements in this type of appliance actually perform ten successive cycles of the carrot type load described with only a one minute waiting time between each cycle, and at the end of these ten cycles they require, for acceptable listing of the product, that the motor windings do not exceed 117° F. rise in temperature above the room temperature. This temperature limitation is well below the temperature required to cause overheating of the motor or to give off an odor. Therefore, it is very helpful to have my new blades cutting semi-solids so effectively and so quickly from a standing start and thus result in less temperature rise of the motor.

When liquidizing a heavy mixture of semi-solids such as two large handfuls of diced carrots in three cups of water, the cutting speed, the freedom from jamming and the flow path of the uncut particles into the blades is definitely superior. In cutting solids such as shaving ice cubes, the amount of solids that can be cut effectively is definitely greater. Performance characteristics are most important. Allowable motor temperature by Underwriter's Laboratory is 194° F. The blade A is short and ground with two sharp edges in a straight line, and by having sharp outer ends on both blades produced by single grinding passes, much lower manufacturing cost is possible, still retaining other desirable blade features.

It will also be noted that the ground edges 35 are applied to the lower surfaces only of the blades A and B. The angle of grind, therefore, tends to draw the material in the liquefier bowl 14 downwardly so that it then flows up the sides of the bowl and tumbles back into the center of the vortex.

Some changes may be made in the construction and arrangement of the parts of my cutting and mixing blades without departing from the real spirit and purpose of my invention, and it is my intention to cover by my claims any modified forms of structure or use of mechanical equivalents which may reasonably be included within their scope.

I claim as my invention:

1. Cutting and mixing blades for liquefiers comprising a diamond shaped lower blade of relatively flat material having two opposite straight cutting edges and two straight non-cutting edges, said cutting edges being ground to an acute angle to the upper surface of the blade whereby the tips of the blades present sharper points than cutting edges, and a somewhat similarly shaped upper blade having its ends bent upwardly and outwardly, the grinding being on the lower surfaces only of said blades.

2. Cutting and mixing blades as set forth in claim 1 wherein said lower blade has said cutting edges ground to an angle of substantially 20°, the aspect angle of the ends of said blade being substantially 40° whereby the tips of the blades present sharp points at angles of substantially 15°, and wherein said upper blade is of greater length than said lower blade.

References Cited in the file of this patent

UNITED STATES PATENTS

| | | |
|---|---|---|
| 2,585,255 | Kochner et al. | Feb. 12, 1952 |
| 2,758,623 | Malz et al. | Aug. 14, 1956 |
| 2,896,924 | Jepson | July 28, 1959 |

FOREIGN PATENTS

| | | |
|---|---|---|
| 806,888 | France | Oct. 5, 1936 |
| 599,568 | Great Britain | Mar. 16, 1948 |
| 1,037,088 | Germany | Aug. 21, 1958 |